(12) United States Patent
Erickson

(10) Patent No.: US 6,679,083 B1
(45) Date of Patent: Jan. 20, 2004

(54) OPPOSED SLANT TUBE DIABATIC SORBER

(76) Inventor: Donald C. Erickson, 1704 S. Harbor La., Annapolis, MD (US) 21401

( * ) Notice: Subject to any disclaimer, the term of this patent is extended or adjusted under 35 U.S.C. 154(b) by 0 days.

(21) Appl. No.: 10/211,137

(22) Filed: Aug. 2, 2002

(51) Int. Cl.[7] .................................................. F25B 15/00
(52) U.S. Cl. .............................. 62/484; 62/476; 62/489
(58) Field of Search .......................... 62/476, 489, 484

(56) References Cited

U.S. PATENT DOCUMENTS

| | | |
|---|---|---|
| 2,826,049 A | 3/1958 | Gilmore |
| 3,254,507 A | 6/1966 | Eberz |
| 3,390,544 A | 7/1968 | Eberz |
| 3,423,951 A | 1/1969 | Eisberg |
| 3,740,966 A * | 6/1973 | Pravda ................... 62/476 |
| 4,106,309 A | 8/1978 | Phillips |
| 4,193,268 A | 3/1980 | Phillips |
| 4,307,572 A | 12/1981 | Brinkerhoff |
| 4,716,958 A * | 1/1988 | Walters et al. ............. 165/142 |
| 4,902,476 A * | 2/1990 | Gordon et al. ............ 422/46 |
| 5,009,086 A * | 4/1991 | Wilkinson .................. 62/476 |
| 5,070,703 A * | 12/1991 | Wilkinson .................. 62/94 |
| 5,339,654 A | 8/1994 | Cook et al. |
| 5,557,946 A | 9/1996 | Sugiyama et al. |
| 5,660,049 A | 8/1997 | Erickson |
| 5,692,393 A | 12/1997 | Klintworth et al. |
| 5,713,216 A | 2/1998 | Erickson |
| 5,729,999 A | 3/1998 | Kuhlenschmidt |
| 5,766,509 A | 6/1998 | Shoji et al. |
| 5,799,502 A | 9/1998 | Nomura et al. |
| 5,916,258 A | 6/1999 | Cho |
| 6,269,444 B1 | 7/2001 | Aguilar et al. |
| 6,314,572 B1 | 11/2001 | Christensen et al. |
| 2002/0069665 A1 * | 6/2002 | Erickson ................... 62/476 |

* cited by examiner

Primary Examiner—Henry Bennett
Assistant Examiner—Mark Shulman

(57) ABSTRACT

A sorber comprised of at least three concentric coils of tubing contained in a shell with a flow path for liquid sorbent in one direction, a flow path for heat transfer fluid which is in counter-current heat exchange relationship with sorbent flow, a sorbate vapor port in communication with at least one of sorbent inlet or exit ports, wherein each coil is coiled in opposite direction to those coils adjoining it, whereby the opposed slant tube configuration is achieved, with structure for flow modification in the core space inside the innermost coil.

20 Claims, 6 Drawing Sheets

OPPOSED SLANT TUBE DIABATIC SORBER

STATEMENT REGARDING FEDERALLY SPONSORED RESEARCH OR DEVELOPMENT

This invention received federal cost share support under Department of Energy Grant DEF636-1G011045.

CROSS-REFERENCE TO RELATED APPLICATIONS

Not applicable

REFERENCE TO A MICROFICHE APPENDIX

Not applicable

FIELD OF THE INVENTION

The present invention relates to geometric configurations for heat and mass transfer involving sorption of a sorbate vapor into (absorption) or out of (desorption) a volatile liquid sorbent accompanied by heat exchange with a heat transfer fluid. Diabatic sorption processes are useful in many industrial processes, and especially in absorption refrigeration cycles and absorption power cycles.

BACKGROUND OF THE INVENTION

Sorption inherently involves mass transfer between vapor and liquid phases. Thus, latent heat is either released (absorption) or acquired (desorption). In adiabatic sorption, that change in latent heat changes the sorbent temperature so much that the extent of sorption is very limited. Therefore, in processes wherein large changes of concentration, i.e., sorbent loading, are desired, heat exchange with an external medium is provided. This is called diabatic sorption.

The heat and mass transfer resistances encountered in sorption processes include the following: heat transfer through the liquid; heat transfer between liquid and vapor; and heat transfer through the vapor; plus mass transfer through the liquid, mass transfer between liquid and vapor, and mass transfer through the vapor. The mass transfer resistance through the vapor is encountered in sorption processes involving a volatile sorbent, i.e., those in which the vapor phase includes appreciable quantities of both sorbate and sorbent molecules. Sorption between ammonia as sorbate and water as sorbent are an example of this—both phases include appreciable quantities of each species, and the "relative volatility" is the ratio of concentrations of the two phases. The vapor phase mass transfer resistance is normally small with a non-volatile sorbent unless non-condensables are present.

The resistance to heat and mass transfer is frequently found to be much greater in sorption processes which have volatile sorbents, owing to the above vapor phase mass transfer resistance. For example, consider the condensation of pure $H_2O$ and of pure $NH_3$ on cooled straight tubes. When an $NH_3$—$H_2O$ vapor mixture is supplied to the same tubes, the overall coefficient of partial condensation or absorption can be more than an order of magnitude lower than the pure vapor condensation coefficient. The effect is similar to what occurs when there is severe blanketing with non-condensables. This major increase in heat and mass transfer resistance has caused the sorbers for volatile sorbents to be large and costly, which limits their application.

The prior art discloses many attempts and approaches to overcoming this problem, with only limited success. U.S. Pat. Nos. 5,339,654; 5,572,885; and 5,713,216 disclose shell and concentric coil arrangements adapted for diabatic vapor-liquid contact, which utilize unusual tube geometries. U.S. Pat. No. 6,314,752 discloses a partially flooded counter-current falling film geometry from folded sheet metal, similar to a known industrial configuration. U.S. Pat. No. 5,766,519 and 5,660,049 disclose diabatic sorber geometries based on channels formed by folded sheet metal which incorporate liquid recirculation. U.S. Pat. No. 5,490,393 discloses a diabatic (GAX) absorber comprised of three concentric coils of tubing in a shell, all with the same coiling direction. Other prior art disclosures of concentric coils in a shell used as a diabatic sorber in an absorption cycle include U.S. Pat. Nos. 3,254,507; 3,390,544; 3,423,951; and 4,106,309. U.S. Pat. No. 4,193,268 discloses a concentric coil evaporator. U.S. Pat. No. 2,826,049 discloses a co-current downflow $NH_3$—$H_2O$ absorber with counter-current heat exchange in a shell-and-tube geometry. An absorption power cycle with a shell-and-coil absorber is disclosed in U.S. Pat. No. 4,307,572. The absorber has crosscurrent mass exchange and co-current heat exchange. U.S. Pat. No. 6,269,644 discloses a more recent absorption power cycle. U.S. Pat. No. 5,692,393 discloses a countercurrent mass exchange shell side desorption with countercurrent heat exchange by a single helical coil. U.S. Pat. No. 5,729,999 discloses a countercurrent mass exchange absorption using helical rods inside multiple cylinders. U.S. Pat. No. 5,557,946 and Swiss Patent 272,868 disclose additional cylindrical coil in shell sorbers. A variety of shell and coil heat exchangers are commercially available for liquid—liquid heat exchange or condensing heat exchange. Absorption power cycles and dual function absorption cycles are disclosed in U.S. Pat. No. 6,269,644.

Sorption is frequently accompanied by a substantial temperature glide, which can be beneficial to the overall transfer process, provided the heat transfer is counter-current, and provided there is no global recirculation of the liquid sorbent—local recirculation is beneficial, per U.S. Pat. No. 5,766,519. The volumetric flow rate of vapor may change during the sorption process by an order of magnitude or more. Similarly, the required flow rate and volume of heat transfer fluid can vary widely, and the large temperature glide may require a large number of transfer units. When using aqueous ammonia as working fluid, all-welded construction is desirable. Nickel-based brazing is acceptable for some metal-joining operations, but it is costly. The sheet metal configurations typically require such brazing, or substantial amounts of precision welding. Conventional shell and straight or U tube geometries must have relatively large spacing between tubes, too large for the desired tortuous flow path, owing to minimum tube-to-tube clearances at the tube sheet. For co-current upflow geometries, the hydrostatic pressure head may become excessive at heights above about 2 m, which restricts tube length in shell and tube configurations with counter-current heat exchange.

Thus, what is needed, and included among the objects of this invention, is a heat and mass transfer device for diabatic sorption with a volatile sorbent, which:

achieves a tortuous and/or turbulent flow path across the heat transfer surface by the sorbate vapor and sorbent liquid, such that the vapor-liquid interface is continuously renewed;

has counter-current heat exchange with a heat transfer fluid;

establishes and maintains good distribution of both fluid phases;

is adaptable to either co-current or counter-current mass exchange;

is preferably highly compact with all welded joints;

accommodates major variations in vapor and/or liquid loading; and preferably can have multiple separate heat transfer fluids, in parallel and/or series.

BRIEF SUMMARY OF THE INVENTION

The above and additional useful objects are achieved by providing a sorber comprised of:

a) at least three concentric coils of tubing contained in a shell;

b) a flow path for liquid sorbent in one direction through said sorber, into a sorbent entrance port and out of a sorbent exit port;

c) a flow path for heat transfer fluid through said sorber which is in counter-current heat exchange relationship with said sorbent flow path;

d) a sorbate vapor port which is in communication with at least one of said sorbent ports;

e) wherein each coil is coiled in opposite direction to those coils adjoining it, whereby an opposed slant tube configuration is obtained; and f) wherein there is structure for flow modification in the core space inside the innermost coil.

The close juxtaposition of tubes slanted in one direction in a particular coil and in the opposite direction in the adjoining coil(s) gives rise to a tortuous, sinuous flow path which is known to provide an excellent liquid phase heat transfer coefficient. For sorption, it has been discovered to additionally overcome the traditional high resistance to heat and mass transfer encountered in volatile sorbent sorption processes provided the coil-to-coil spacing is less than about 4 mm and preferably less than 1.5 mm. It is theorized that this is the result of the tortuous flow path acting on the vapor-liquid interface to continuously distort it, and hence counteract the concentration gradients which otherwise build up at the interface. This action is further abetted by pressure equalization flow paths between the inside and outside of each coil, which tend to keep the sorbent and sorbate well distributed across the coils, especially in co-current upflow sorption. Surprisingly, there is substantial fluid flow area available even when the coil-to-coil spacing is zero. This is only true with the disclosed opposed slant tube configuration.

DETAILED DESCRIPTION OF THE INVENTION

Figure 1:
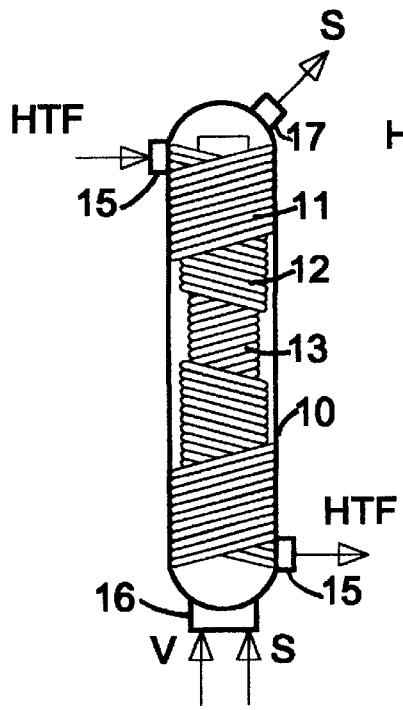
FIGS. 1 through 5 illustrate various modes of absorption possible with the opposed slant tube diabatic sorber, distinguished according to whether the absorption is shell side or tube side, cocurrent or countercurrent mass exchange, and upflow or downflow.

Referring to FIG. 1, the subject apparatus is depicted in cutaway view in an embodiment in which absorption is occurring in co-current upflow mass exchange mode on the shell side, and heat transfer fluid is flowing countercurrent to sorbent flow on the tube side. The apparatus is comprised of shell 10; three coils of tubing 11, 12, and 13; partial core blocker 14; heat transfer fluid inlet and outlet ports 15; at least one supply port 16 for vapor and sorbent into the bottom of the shell; and a sorbent exit port 17 in the top portion of the shell.

Figure 2:
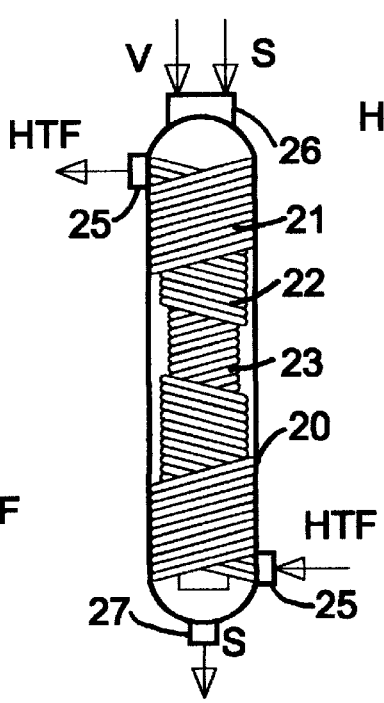

FIG. 2 is a cutaway view of a co-current downflow shell side absorption in the opposed slant tube configuration. The numbered components 2X have descriptions corresponding to the similarly numbered 1X components of FIG. 1 and similarly for the remaining figures. The difference from FIG. 1 is that the absorbing fluids flow down through the shell, and the heat transfer fluid flows up through the tubes. The core blocker 24 is thus biased toward the lower end, instead of the upper end.

Figure 3:
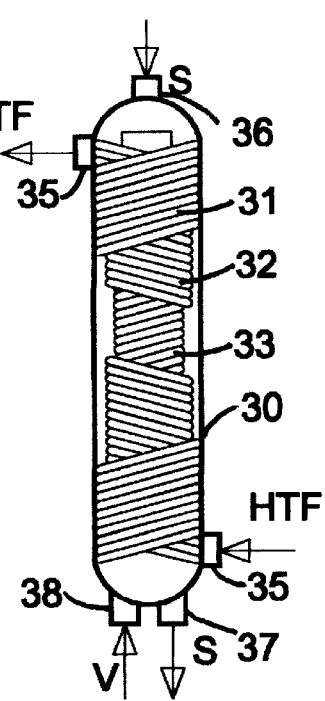

FIG. 3 also schematically depicts shell side absorption, but in counter-flow mode. Hence sorbent flows down, and vapor flows up, through the shell. The bottom portion of the shell includes a vapor entry port 38 as well as a sorbent exit port 37.

Figure 4:
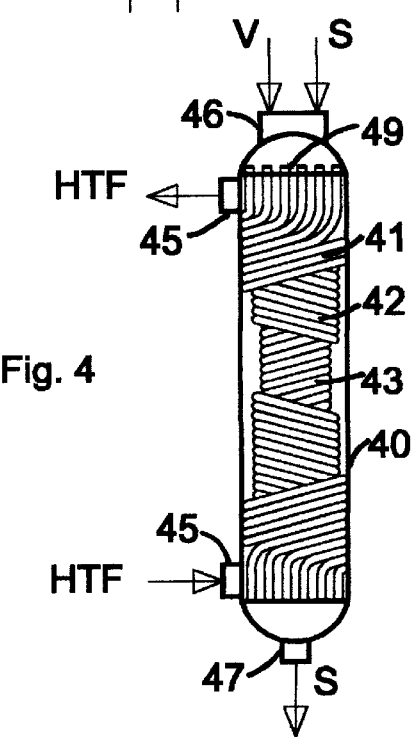

FIG. 4 depicts tube side downflow absorption. Tube coils 41, 42, and 43 contain the absorbing fluids, and shell 40 contains the heat transfer fluid. When the heat transfer fluid is on the shell side, and doesn't change phase, the core blocker is normally the full length of the tube bundle. It is important to distribute vapor and sorbent approximately equally into every tube, so fluid distributors 49 are located at the tube ends, and the tube sheet is horizontal to abet the distribution. Many standard distributor designs are known: V notched tube stubs, perforated tube stubs, etc.

Figure 5:
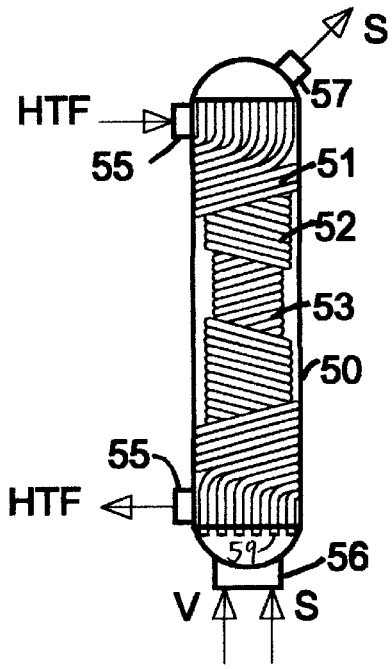

FIG. 5 depicts tube side upflow absorption: tube distributors 59 are now at the bottom, and sorbent exit port 57 is at the top.

Figure 6:
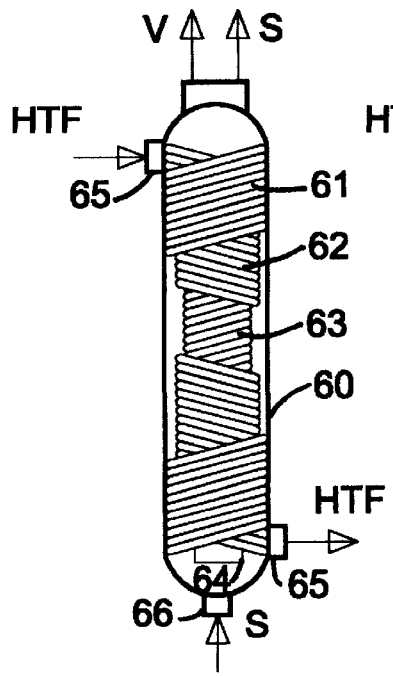
FIGS. 6 through 10 illustrate corresponding desorption modes.

FIG. 6 depicts shell side desorption in upflow mode. The heat transfer fluid flowing through ports 65 and the tube bundle (61, 62, 63) is now a heating fluid, causing the desorption. Sorbent entry port 66 is in the bottom portion of the shell, and the desorbed vapor exits at the top, plus any remaining sorbent. Core blocker 64 is in at least the bottom portion of the coiled tube bundle.

Figure 7:
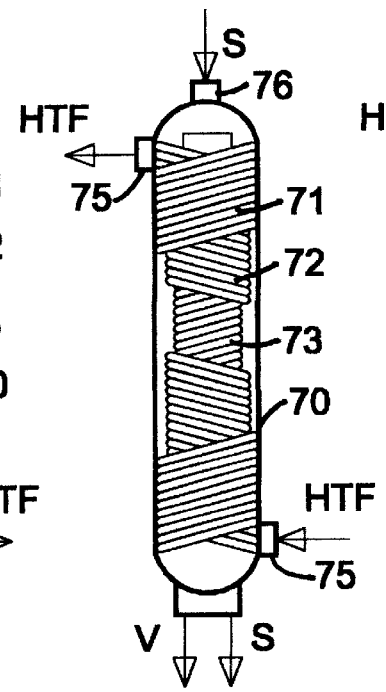

FIG. 7 depicts co-current shell side downflow desorption: the sorbent entry port 76 and core blocker 74 are thus in the top portion of the shell and bundle respectively.

Figure 8:
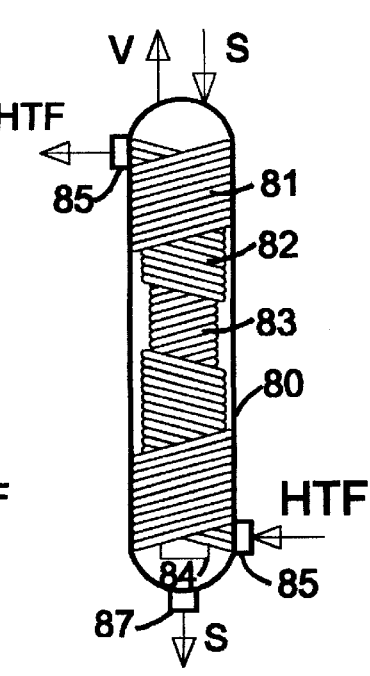

FIG. 8 depicts countercurrent shell side desorption. Thus sorbent exit port 87 is at the bottom, as is core blocker 84, and desorbed vapor exits at the top.

Figure 9:
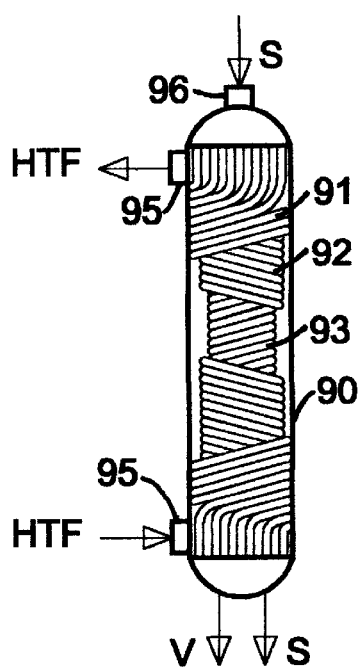

FIG. 9 depicts tube side co-current downflow mass exchange desorption. Sorbent liquid is supplied to entry port 96 at the top, flows downward through the tube bundle comprised of coils 91, 92, and 93, and the desorbed vapor plus remaining sorbent exit at the bottom. Heating heat transfer fluid enters port 95 and flows upward through shell 90, in counter-current heat exchange relationship with the tube side sorbent flow. The tube bundle includes a core blocker 94, not shown.

Figure 10:
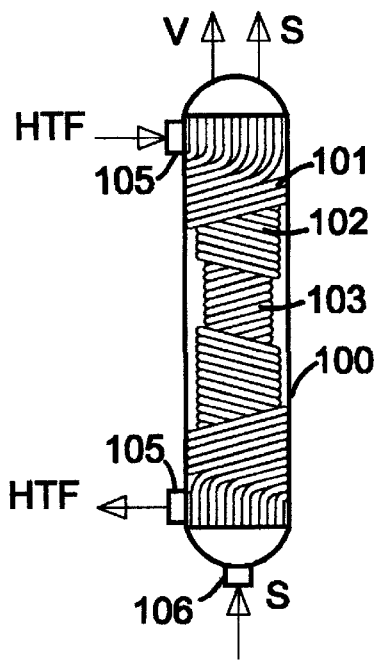

FIG. 10 depicts tube side co-current upflow desorption, with sorbent entering the tubes at the bottom through port 106. When the entering sorbent contains little or no vapor, there is no need for tube distributors with desorption.

Figure 11:
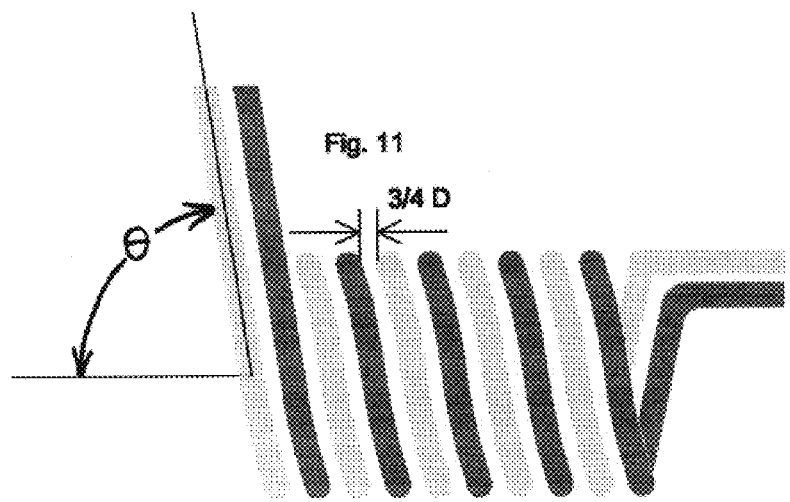
FIGS. 11 and 13 depict a single coil of tubing having two starts.
Figure 12:
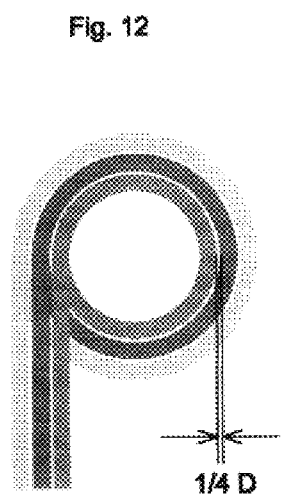
FIGS. 12 and 14 depict three concentric coil of tubing.
Figure 13:
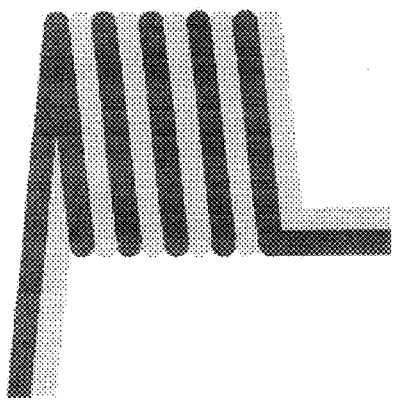
Figure 14:
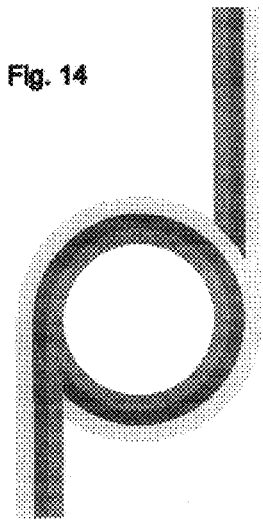

FIG. 11 is a schematic depiction of a single coil of tubing having two starts, and illustrating the definition of slant tube angle θ, and tube-to-tube spacing (shown here as three fourths of a tube diameter). FIG. 12 illustrates three concentric coils, and shows a coil-to-coil spacing of one fourth of a tube diameter. FIG. 13 shows a two start coil with zero tube-to-tube spacing, and FIG. 14 shows three concentric coils with zero coil-to-coil spacing.

Figure 15:
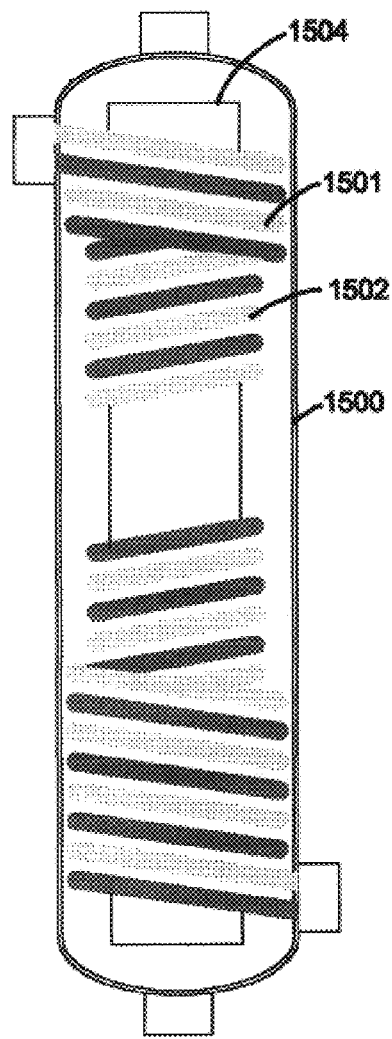
FIG. 15 illustrates an opposed slant tube (OST) diabatic sorber which has 2 concentric coils, each with two starts, plus a core blocker.

FIG. 15 is a cutaway schematic of an opposed slant tube diabatic sorber with two concentric coils 1501 and 1502, each with two starts, contained in shell 1500, and with full length core blocker 1504, where the tube-to-tube spacing is ¾ D and the coil-to-coil spacing is ¼ D.

Figure 16:
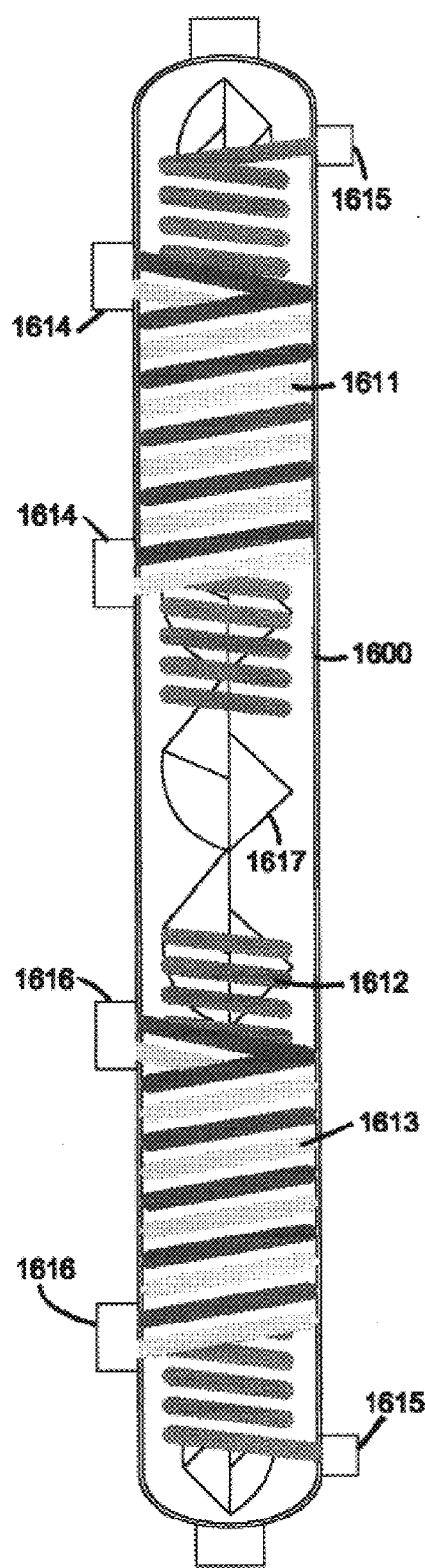
FIG. 16 illustrates an OST diabatic sorber with three separate tube bundles, and a helical ribbon core.

FIG. 16 is a cutaway schematic view of an opposed slant tube sorber comprised of three separate bundles of concentric tube coils contained in shell 1600. Tube bundle 1611 is accessed through fluid ports 1614; bundle 1612 is accessed through fluid ports 1615; and bundle 1613 is accessed through fluid ports 1616. The core space of this sorber is illustrated with a helical ribbon 1617, in lieu of a blocker.

Figure 17:
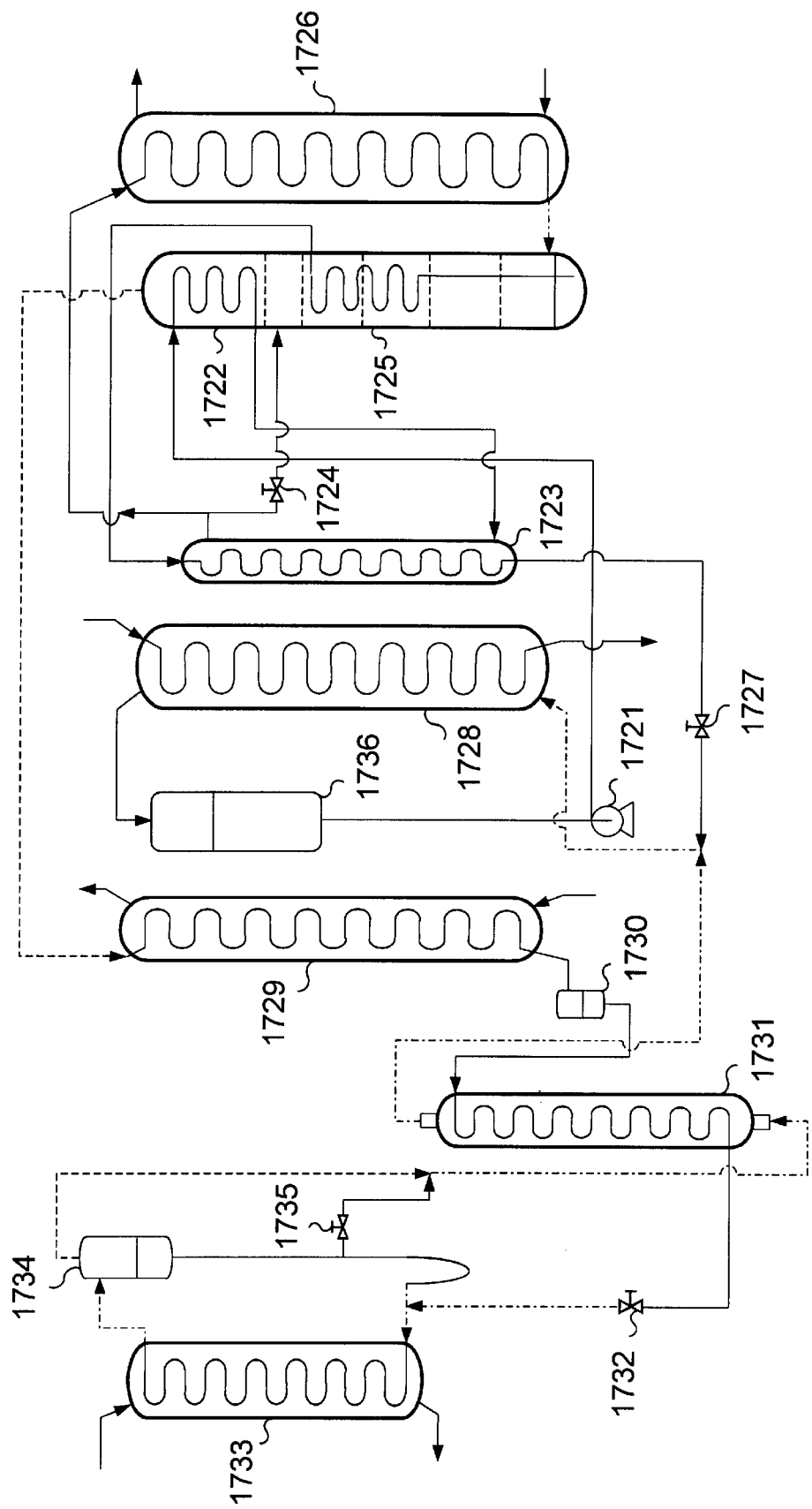
FIG. 17 is a flowsheet of an absorption refrigeration cycle adapted to use OST diabatic sorbers.

FIG. 17 is a schematic flowsheet of a heat activated absorption refrigeration cycle which utilizes one or more opposed slant tube sorbers. Solution pump 1721 sends liquid sorbent through solution cooled rectifier 1722, then through solution heat exchanger 1723 and then to a split. Control 1724 feeds part of the sorbent to rectifier 1725, and the remainder is routed to heat recovery vapor generator 1726, where it is desorbed by heat exchange with a heat source. The resulting mixture of desorbed vapor plus remaining sorbent is routed to rectifier 1724, where it is distilled into bottom liquid product (sorbent strong in absorbing power) and overhead refrigerant vapor. The bottom liquid undergoes optional internal heat exchange in the rectifier, and then is routed to the solution heat exchanger 1723, then through pressure reduction means 1727, and finally into absorber 1728. The refrigerant vapor from rectifier 1725 is condensed in condenser 1729, collected in receiver 1730, and then flows through refrigerant heat exchanger (RHX) 1731, where it is subcooled. It is then expanded in pressure reduction means 1732, and enters flooded evaporator 1733. Two phase mixture from the evaporator is separated in separator 1734, the vapor is routed to RHX 1731, and the liquid is recycled, with a small purge withdrawn at control 1735. The warmed vapor from RHX 1731 is absorbed in absorber 1728, collected in solution receiver 1736, and is recycled to solution pump 1721.

Every one of the recited heat exchangers can beneficially be supplied as an opposed slant tube sorber. HRVG 1726 is a tube side co-current downflow sorber; absorber 1728 is a shell side co-current upflow absorber; RHX 1731 is a shell side co-current upflow desorber, and so on. Even the SHX 1723 can be a shell side co-current upflow desorber, as normally there is a slight amount of vapor exiting. These designations are only indicative of the possible beneficial opposed slant tube sorber applications, and not intended to be limiting.

Figure 18:
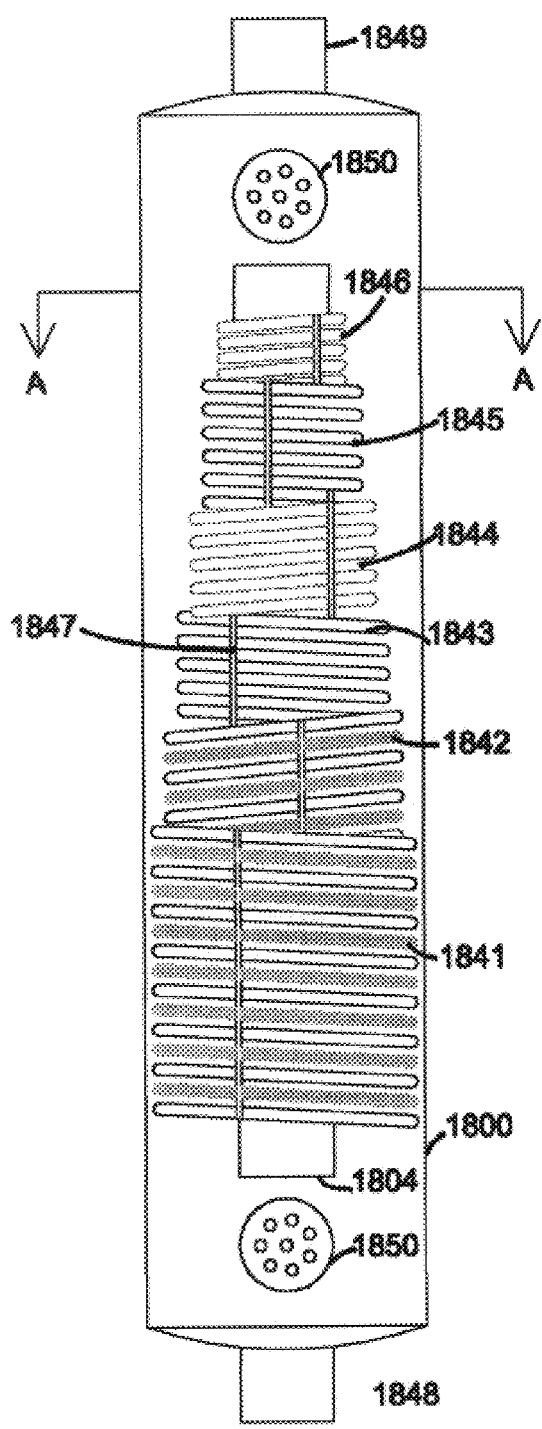
FIGS. 18 and 19 are front and top views of a heat exchanger suitable for use in an absorption refrigeration cycle.
Figure 19:
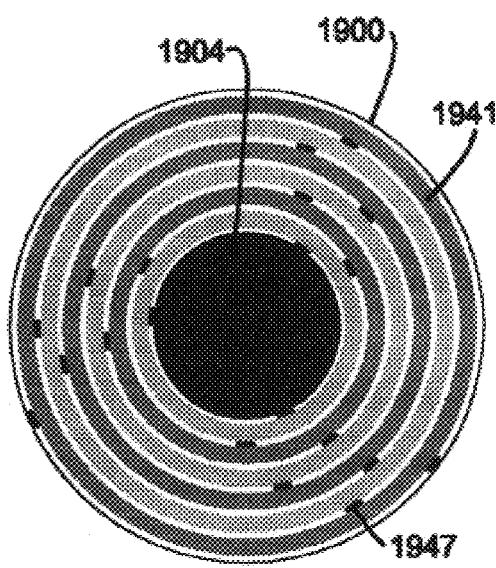

FIG. 18 and 19 illustrate details of an opposed slant tube sorber which was designed and fabricated to serve as RHX 1731 in a 26-ton waste heat powered absorption refrigeration cycle.

FIG. 18 is a cutaway schematic view of an opposed slant tube sorber comprised of shell 1800, containing six concentric coils of tubing (1841 through 1846) where the even numbered coils are wound clockwise and the odd numbered coils wound counterclockwise, whereby the opposed slants are achieved. The inner core is blocked by core blocker 1804. The two largest coils have two starts, and the four inner coils are single start. The tube diameters are 6.4 mm, and the average length of each tube is 13 m. The shell inner diameter is 144 mm, and the core outer diameter is 57 mm. The coiled height is approximately 0.5 mm, and the coil-to-coil and coil-to-shell spacings are 0.8 mm. Spacing bars 1847 are used to maintain the desired spacing. Cold refrigerant vapor and purge liquid are supplied to shell inlet port 1848, and warmed vapor is withdrawn from port 1849. The eight tubes are supplied through tube sheets 1850. With 26 tons of chilling at 52° F., this configuration was tested and found to have a U value of 1400 W/m²K at a pressure drop of 7 kPa.

FIG. 19 is a schematic cross-sectional view of the FIG. 18 apparatus at section A—A.

The tube slant angle is an important aspect of the geometry of this sorber. FIG. 11 illustrates the definition of the tube slant angle—the angle between the tube axis and the coil axis. Consider a coil with a single tube (one "start"), and with zero tube-to-tube spacing, i.e. tightly coiled such that adjacent loops of the coil are touching one another. The tube slant angle is then $$\theta = 90° - \arctan((ND/\pi(d-D)))$$

where D is the tube outer diameter, and N is the number of starts, and d is the coil outer diameter. For example, given a tube diameter of 12 mm and a coil diameter of 48 mm, the slant angle is 83.94° for a single start coil, and 78.02° for a two start coil.

The slant angle becomes progressively smaller as the number of starts is increased; as the coil diameter is decreased; and as the tube-to-tube spacing is increased.

The length of each individual tube in a coil is calculated as ND / cos θ, where H is the coil height. Tube lengths in the range of 2 m to 50 m are contemplated, with 4 m to 8 m preferred. A major advantage of the disclosed vertical shell side upflow sorber is that long tubes can be accommodated in a short shell height, thus keeping hydrostatic pressure low and tube count low. Low tube count simplifies the manufacturing process.

Tube slant angles in the range of 87° to 50° are contemplated, and preferably from 85° to 64°. Note that to keep the slant angles of the various coils approximately equal, the tube count (number of starts) increases as the coil diameter increases. Tube diameters are contemplated from 4 mm to 25 mm; shell diameters from 75 mm to 2 m; coil heights from 0.5 m to 2.5 m; and tube-to-tube spacings from 0 to 1 tube diameter.

The coil-to-coil spacing and the coil-to-shell spacing are found to be highly important in shell side sorptions. By staying below a critical small value, the mass transfer is highly enhanced, presumably due to the aggressive and repetitive distortion of the vapor-liquid interface as the fluids traverse the tortuous shell-side flow paths. The mass transfer noticeably improves when that spacing decreases below 4 mm. The smaller that spacing, the better the mass transfer. However, smaller spacing also increases pressure drop. For higher-pressure sorptions, spacings as small as zero are beneficial, whereas at lower pressures, coil-to-coil spacings of 0.5 mm to 1.5 mm are preferred.

The relative flow areas on the tube side and shell side of the disclosed opposed slant tube configuration with a central core blocker are quite variable. The tube side flow area is minimum with only a single start tube in each coil, and increases as the number of starts, i.e. tube count, increases. As related elsewhere, the number of starts affects the slant angle, and cannot exceed the value which decreases the slant angle below its prescribed minimum (50°). For practical configurations, the tube side flow area can vary between about 5% and 30% of the empty shell cross section. The effective shell flow area ranges from about 20% to about 75% of the empty shell cross section, dependent upon the coil-to-coil spacing, and the tube-to-tube spacing. Surprisingly, even when the coil-to-coil spacing is zero, there is appreciable shell-side flow area, owing to the opposed slant tube configuration—much more than what would be obtained when all coils slant the same direction. The opposed slant tube configuration makes the path more tortuous and increases flow area—both beneficial.

The result of these relative flow area relationships is that whenever there is a large difference in volumetric flow rate (with due regard for the specific volume) between the heat transfer fluid and the sorbing fluid, the one with smaller flow rate should be placed on the tube side. The velocity of each fluid should be maintained high enough to provide good heat transfer, while not exceeding the allowable pressure drop. The disclosed geometry facilitates this. Example 1—the absorber for an ammonia absorption cycle absorbing at 500 kPa absorbs 0.87 l/s $NH_3$ vapor per ton of chilling, and the cooling water flow rate (20° C. temperature rise) is 0.063 l/s. Hence absorption is shell side. Example 2—the desorber for an ammonia absorption cycle desorbing at 1,700 kPa desorbs 0.3 l/s $NH_3$ vapor per ton of chilling, and the heating hot water flow rate (10° C. temperature change) is 0.13 l/s. In this case, the flow rates are similar enough (differ by factor of 2.2) that tube side desorption can be selected, which results in a lower shell side pressure rating, plus provides other advantages, e.g., acceptable pressure drops. The third example is the refrigerant heat exchanger—a type of desorber. The flow rate of 500 kPa $NH_3$ vapor is 0.87 l/s, whereas the flow rate of liquid refrigerant is 0.0054 l/s. Hence shell side desorption is selected.

One result of the disclosed opposed slant tube geometry is that there is no straight path through the tube bundle with dimension any wider than 4 mm, preferably not larger than 1.5 mm. Many locations of greater width are present in the bundle, but only accessible by squeezing through the narrow gaps. Another advantage is that the fluids flow obliquely over the tubes, which is known to be superior to either perpendicular flow or coaxial flow.

A sorber can experience a large change in volumetric flow from one end to the other, e.g. an order of magnitude change or more. Thus, it is very important that a blocking core be present at the low flow end for shell side sorption. The spacing between the inner coil and the blocking core should be approximately the same as that between the outer coil and the shell, i.e. 0 to 4 mm (typically 1 mm). At the other end, the large flow end, it can be beneficial to have a perforated core, thus admitting vapor in crossflow mode, in an absorber; and/or a helical ribbon or other fluid swirling structure, to accommodate large desorbed volumes. These features allow larger fluid loadings and/or lower pressure drops in a given configuration.

Although all the drawings are illustrated with circular cross section coils, it will be recognized that other shapes will work equally well: polygons (square, rectangle, hexagon, octagon, etc.), ovals, ellipses, and the like. Each would require obvious modifications to the tube bending regimen.

The tubes may be smooth or grooved. The tube-to-tube spacing can be varied along the length of the coil—this is another way to accommodate large flow rate volume changes.

This opposed slant tube sorber configuration is useful in some vapor compression cycles, as well as in absorption cycles. Vapor compression cycles which utilize a mixed refrigerant entail a condensation step which has temperature glide, hence incorporates in essence an absorption. Similarly, the evaporation step incorporates a desorption. Hence the term (sorption" should be understood to encompass mixed refrigerant phase change.

What is claimed is:

1. A sorber comprised of:
    a) at least three concentric coils of tubing contained in a shell;
    b) a flow path for liquid sorbent in one direction through said sorber, into a sorber an entrance port and out a sorbent exit port;
    c) a flow path for heat transfer fluid through said sorber which is in counter-current heat exchange relationship with said sorbent flow path;
    d) a sorbate vapor port which is in communication with at least one of said sorbent ports;
    e) wherein each coil is coiled in opposite direction to those coils adjoining it, whereby the opposed slant tube configuration is obtained;
    f) wherein the tube slant angle of each coil is in the range of 85° to 50°; and
    g) wherein there is structure for flow modification in the core space inside the innermost coil.

2. The apparatus according to claim 1 wherein the coil-to-coil spacing and coil-to-shell spacing is in the range of 0 to 4 mm.

3. The apparatus according to claim 1 wherein at least one of said coils is comprised of a single tube and at least one other coil is comprised of at least two tubes.

4. The apparatus according to claim 1 adapted for shell side sorption, and additionally comprised of spacers between the coils which maintain the coil-to-coil spacing in the approximate range of 0.5 mm to 1.5 mm.

5. The apparatus according to claim 1 adapted for shell side sorption and additionally comprised of an inner core blocker no more than two thirds the length of said coils which is biased toward one end of the coils.

6. The apparatus according to claim 1 adapted for tube side sorption, and additionally comprised of a horizontal tubesheet plus vapor-liquid distributors attached to one end of each tube.

7. The apparatus according to claim 1 wherein the coil cross-section is non-circular.

8. The apparatus according to claim 1 wherein the heat transfer fluid undergoes phase change, whereby latent heat is transferred.

9. The apparatus according to claim 1 adapted for shell side sorption, and comprised of at least two hermetically separate tube side heat transfer fluids.

10. The apparatus according to claim 1 wherein aqua ammonia is the sorbent and the vapor is nearly pure ammonia.

11. The apparatus according to claim 1 wherein the sorbent is a mixed refrigerant.

12. The apparatus according to claim 1 adapted for shell side upflow sorption.

13. An absorption cycle apparatus wherein the improvement comprises at least one opposed slant tube diabatic sorber comprised of at least three coils of tubing with coil-to-coil spacing less than 4 mm, said sorber utilized as any of the absorber, the desorber, the GAX, the refrigerant heat exchanger, the solution cooled rectifier, or the generator heat exchanger of said absorption cycle.

14. The apparatus according to claim 13 wherein aqua ammonia is the working fluid and wherein at least two of said absorption cycle components are opposed slant tube diabatic sorbers, and wherein the cycle is adapted for producing at least one of chilling and power.

15. A cocurrent mass exchange sorber comprised of a shell and at least two concentric coils of tubing, characterized by:
   a. the coil axes are vertical;
   b. adjacent coils are coiled in opposite directions;
   c. the coil-to-coil and coil-to-shell spacing is less than about 1.5 mm, and less than one fourth of the tube diameter;
   d. each coil is comprised of at least two starts; and
   e. the core space inside the innermost coil is at least partially blocked.

16. The apparatus according to claim 15 wherein the tube diameters are in the range of 4 to 26 mm, and the shell diameter is in the range of 75 mm to 2 m, and the coil heights are in the range of 0.5 m to 2.5 m and the tube angles are in the range of 50° to 85° from vertical.

17. The apparatus according to claim 16 additionally comprised of a liquid sorbent entry port in the bottom portion of said shell.

18. The apparatus according to claim 17 additionally comprised of a vapor exit port in the top portion of said shell, and a heating fluid flowing downward through said coils.

19. The apparatus according to claim 17 additionally comprised of a liquid sorbent exit port in the top portion of said shell, and a cooling fluid flowing downward through said coils.

20. The apparatus according to claim 16 additionally comprised of a liquid sorbent supply port at the top of said coils, and a heat transfer fluid supply port in said shell.

* * * * *